United States Patent
Cyrille et al.

(10) Patent No.: US 7,094,130 B2
(45) Date of Patent: Aug. 22, 2006

(54) METHOD FOR FABRICATING A MAGNETIC TRANSDUCER USING A SLURRY WITH SPHERICAL PARTICLES FOR CMP-ASSISTED PHOTORESIST LIFT-OFF

(75) Inventors: Marie-Claire Cyrille, San Jose, CA (US); Frederick Hayes Dill, South Salem, NY (US); Jui-Lung Li, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/222,611

(22) Filed: Sep. 9, 2005

(65) Prior Publication Data

US 2006/0025057 A1 Feb. 2, 2006

(51) Int. Cl.
*B24B 1/00* (2006.01)
(52) U.S. Cl. .................. 451/29; 451/60; 29/603.07; 430/319
(58) Field of Classification Search .............. 451/5, 451/57, 29, 30, 60; 29/603.16, 603.18, 603.07, 29/831; 430/320, 319; 216/22
See application file for complete search history.

(56) References Cited

U.S. PATENT DOCUMENTS

| | | | |
|---|---|---|---|
| 5,715,597 A * | 2/1998 | Aylwin et al. ........... 29/603.08 |
| 6,381,107 B1 | 4/2002 | Redon et al. |
| 6,468,436 B1 * | 10/2002 | Shi et al. ..................... 216/22 |
| 6,554,878 B1 | 4/2003 | Dill et al. |
| 6,576,113 B1 | 6/2003 | Scherer et al. |
| 6,583,957 B1 | 6/2003 | Takeshita et al. |
| 6,669,983 B1 | 12/2003 | Kagami et al. |
| 6,858,909 B1 * | 2/2005 | Cyrille et al. ............... 257/414 |
| 2002/0034043 A1 | 3/2002 | Okada |
| 2003/0168627 A1 | 9/2003 | Singh et al. |
| 2003/0219626 A1 | 11/2003 | Partee |

OTHER PUBLICATIONS

Spallas, et al., "Perpendicular current giant magnetoresistance in 0.4 micron diameter Co-Cu multilayer sensors", IEEE Trans. Magnetics, vol. 32, No. 5, Sep. 1996, pp. 4710-4712.

* cited by examiner

*Primary Examiner*—Jacob K. Ackun, Jr.
(74) *Attorney, Agent, or Firm*—G. Marlin Knight

(57) ABSTRACT

A method is described which uses a CMP slurry with an abrasive of spherical particles to lift-off photoresist used in the patterning of the sensor for a magnetic transducer. The spherical particles, preferably less than 0.015 microns, are preferably silica, alumina, titania or zirconia with colloidal silica being preferred. An alternative method of fabricating a CPP sensor structure according to the invention deposits a dielectric or CMP resistant metal over the hard bias structure. The CMP-resistant metal is preferably selected from the group consisting of rhodium, chromium, vanadium and platinum. A CMP resistant mask deposited over the dielectric or CMP-resistant metal can include an optional adhesion layer such as tantalum followed by a DLC layer. The CMP-assisted lift-off of the photoresist and the excess materials is executed at this point. The photoresist used to protect the selected area of the sensor structure is lifted-off using the slurry.

15 Claims, 4 Drawing Sheets

METHOD FOR FABRICATING A MAGNETIC TRANSDUCER USING A SLURRY WITH SPHERICAL PARTICLES FOR CMP-ASSISTED PHOTORESIST LIFT-OFF

RELATED APPLICATION

U.S. patent application Ser. No. 10/909,121, with a filing date of Jul. 30, 2004, by the present applicants describes the use of the CMP-resistant metallic layer which is included in one of the embodiments described below.

FIELD OF THE INVENTION

The invention relates to the field of thin film device fabrication and more particularly to methods, materials and structures used to fabricate a magnetic sensor for magnetic transducers used in data storage devices; and even more particularly, the invention relates methods, materials and structures used in combination with chemical-mechanical polishing (CMP) processes during the fabrication of magnetic sensors.

BACKGROUND OF THE INVENTION

The read and write head portions of the slider for use in a typical prior art magnetic disk recording system are built-up in layers using thin film processing techniques. In the typical process of fabricating thin film magnetic transducers, a large number of transducers are formed simultaneously on a wafer. After the basic structures are formed the wafer is cut into rows or individual transducers.

The magnetic sensor can be any one of various types including tunnel-junction (TMR) and spin valves. In TMR and some spin valves designs the current in the sensor flows perpendicular to the film (CPP). The fabrication problems for TMR and CPP spin valves sensors are different than for those where current flows in the plane of the film (CIP). FIG. 1 illustrates selected components in a TMR head 10 as viewed from the ABS. In CPP sensors the lower electrical lead 22 is also the magnetic shield S1. The upper electrical lead 23 is also the magnetic shield S2. The hard bias layer structure 16 which conventionally abuts the sensor must be electrically insulated from the sensor and the S1 shield. The hard bias structures are, therefore, sandwiched between two dielectric layers such as alumina 15, 17. The section of the head shown in FIG. 1 is along the plane which will become the air-bearing surface after further processing. The track centerline is shown on the ABS passing over the sensor structure perpendicular to the plane of the thin films. The ABS is exposed after the fabrication of the thin film structures by cutting the wafer.

Lift-off patterning is a general process that is used to define structures on the surface of a wafer. The lift-off process typically involves the deposition of resist material, followed by a sequence of other processes, including exposure, development, metal or dielectric deposition, and subsequent removal of the resist protective layer along with the unwanted materials deposited on top of the resist, in order to pattern a structure on a substrate. A CMP-assisted lift-off process uses a slurry with abrasive particles assisted by a low-pressure chemical mechanical polishing technique. The typical CMP lift-off slurry also includes surfactants and corrosion inhibitors.

FIG. 2 illustrates a section of wafer 11 on which a plurality of partially completed CPP magnetic heads are being manufactured according to the prior art. The phase of the fabrication process represented in FIG. 2 is when the track width of the sensor structure 14 is defined, i.e., the width of sensor structure perpendicular to the track centerline. The sensor 14 and diamond-like carbon (DLC) layer 63 have been deposited and patterned and the refill materials which form the structures at the sides of the sensor have been deposited. Since multiple materials are used in this refilling process, it is referred to as a "refill stack." The first layer of the refill stack is a dielectric such as alumina 15. The hard bias structure 16 in this example consists of three layers: chromium (Cr), a hard ferromagnetic material and tantalum (Ta). The hard bias structure 16 is followed by a second dielectric layer such as alumina 17. A thin tantalum layer 18 and a DLC layer 19 complete the layers at the selected state of the process. The portion of the dielectric layer 15 deposited on the side of sensor 14 is critical since it acts to insulate the electrically conductive hard bias materials from the sensor. After the refill materials have been deposited, a chemical-mechanical polishing (CMP) is used to lift-off the photoresist (not shown) and the unneeded portions deposited films. Current slurries used in photoresist lift-off for magnetic heads have abrasive particle sizes around 0.15 microns.

The prior art CMP process has been partially executed in FIG. 2 to illustrate the initial stages of damage that can occur during the process. The DLC and Ta layers at the edge of the sensor have failed in that they have been completely removed when they ideally should survive the CMP. The DLC is intended to be CMP resistant, but can fail. The failure of the DLC layer results in the erosion of the edges of the upper dielectric 17, the hard bias structure 16 and the lower dielectric 15 since they are relatively fragile. In FIG. 3 the areas 26A, 26B next to the sensor 14 illustrates more severe damage that can occur during the CMP process where the lower dielectric layer 15 has been eroded exposing the side surface of the sensor 14 which means that the head will be defective. The process window in the prior art for the CMP lift-off process after deposition of the refill stack is too small for reliable, high yield manufacturing and results in frequent damage to critical structures next to the sensor.

In U.S. Pat. No. 6,554,878 to Dill, Jr., et al., a slurry is described for chemically-mechanically polishing copper, alumina and nickel iron to a common plane. The slurry includes colloidal silica, potassium and/or sodium persulfate and ammonium persulfate. The concentrations are tailored to chemically-mechanically polish alumina and nickel iron at the same rate or to chemically-mechanically polish the copper at the same rate as the other materials to the same plane.

U.S. Pat. No. 6,669,983 to Kagami, et al. describes a manufacturing method for a thin-film magnetic head with an MR structure in which a current flows in a direction perpendicular to surfaces of layers of the MR structure. Various embodiments are described in which CMP is used to planarize the wafer. In one embodiment the insulation film which is deposited at the sides of the MR structure is flattened by CMP until at least upper surface of the MR multi-layered structure is exposed. In another embodiment the photoresist on top of the MR structure is left in place when the insulating film is deposited, then CMP is used to partially planarize the wafer removing the insulating material from above the photoresist, but leaving the photoresist itself. The remaining photoresist is then removed by solvent. The slurry described in Kagami '983 consists of colloidal silica, cerium oxide, corundum, boron nitride, diamond, chromium oxide, iron oxide, fumed silica, alumina and zeolite, or of a mixture containing one of colloidal silica, cerium oxide, corundum, boron nitride, diamond, chromium oxide, iron oxide, fumed silica, alumina and zeolite may be additionally used. The slurry has an average particle diameter of 100 nm or less, preferably 50 nm or less, more preferably 10 nm or less.

What is needed is an improved slurry and method for its use in photoresist lift-off when fabricating the structures in magnetic heads.

SUMMARY OF THE INVENTION

A method is described which uses a CMP slurry with an abrasive of spherical particles to lift-off photoresist used in the patterning of the sensor for a magnetic transducer. An embodiment of a method according to the invention uses a slurry with an abrasive of spherical particles of silica, alumina, titania or zirconia with colloidal silica being preferred. The size of the particles is preferably less than 0.015 microns. The pH is preferably alkaline and even more preferably a pH of about 10–11. In a method according to the invention a CPP sensor structure width and/or height is defined according to the prior art by removing excess sensor material at opposite sides of the sensor structure to form voids to define the track width or stripe height. As a part of this process a photoresist is patterned to protect the selected area of the sensor structure. A dielectric material is deposited over the wafer. This dielectric will be deposited into the voids and onto to the exposed sides of the sensor structure. The layers for a hard bias structure are deposited onto the dielectric material. A dielectric material can be deposited over the hard bias structure as in the prior art or a CMP resistant metal can be substituted instead. The CMP-resistant metal is selected from the group consisting of rhodium, chromium, vanadium and platinum. One or more layers for a CMP resistant mask and optionally an adhesion layer are deposited over the dielectric or CMP-resistant metal. The CMP resistant mask can include an adhesion layer such as tantalum followed by a DLC layer. The CMP-assisted lift-off of the photoresist and the excess materials is executed at this point. The slurry formulation according to the invention is used to achieve removal of the photoresist within a process window that is sufficiently wide to allow removal without damaging the head structures. The CMP resistant mask is removed after completion of the CMP process. The fabrication of the head continues at this point according to the prior art including the formation of the upper shield (S2) which is also the upper electrical lead.

DETAILED DESCRIPTION OF THE INVENTION AND THE PREFERRED EMBODIMENTS

Figure 1:
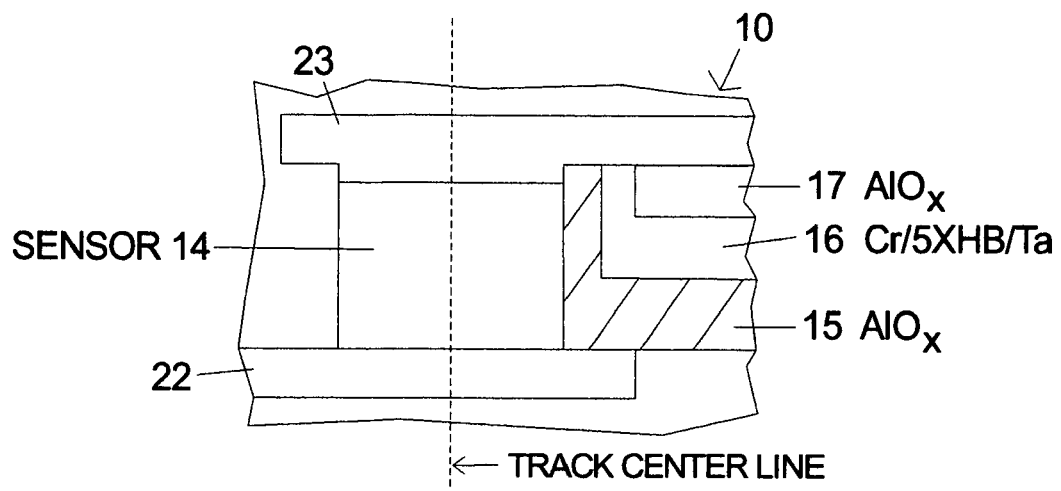
FIG. 1 is an illustration of selected structures of a prior art TMR magnetic head as viewed from the ABS.
Figure 2:
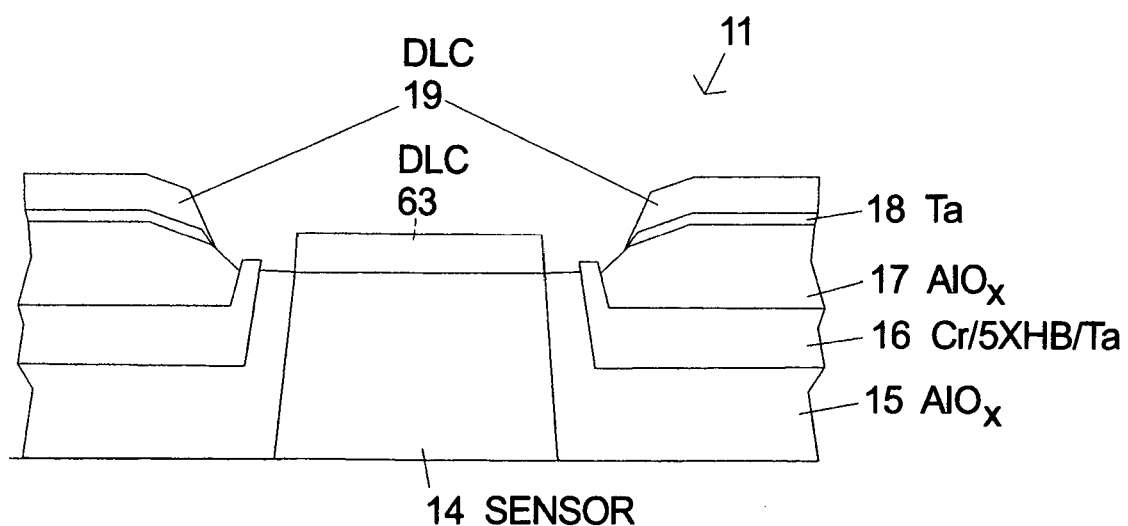
FIG. 2 is an illustration of a section of a wafer on which CPP magnetic heads after being manufactured according to the prior art after a prior art CMP process has been executed and damage has occurred to the DLC layer and structures at the side of the sensor. The section is taken perpendicular to the surface of the wafer and the plane of the thin films. The phase of the process illustrated is defining the track width of the sensor.
Figure 3:
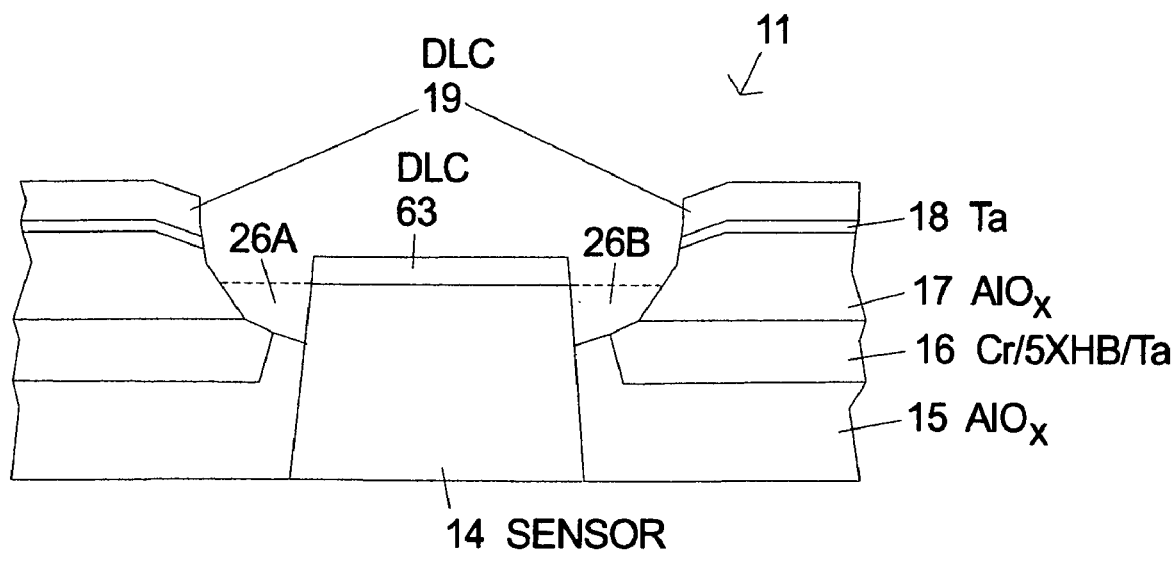
FIG. 3 is an illustration of a section of the wafer of FIG. 2 after further prior art CMP has been executed and damage has occurred to the structures at the side of the sensor. The section is taken perpendicular to the surface of the wafer and the plane of the thin films. The phase of the process illustrated is defining the track width of the sensor.
Figure 4:
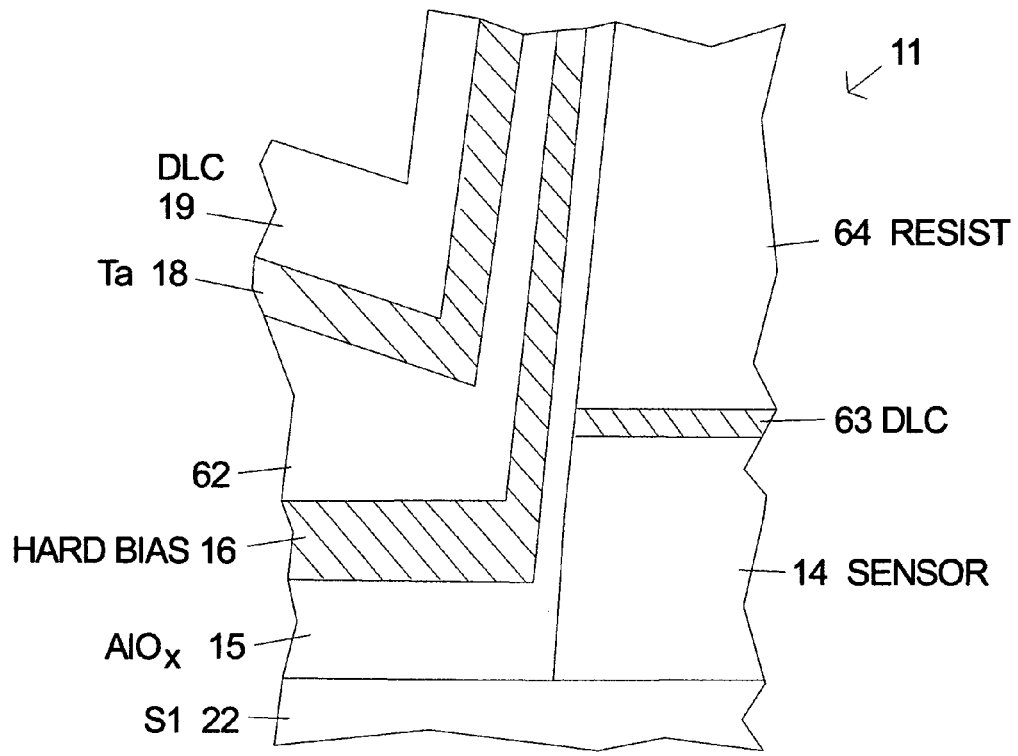
FIG. 4 is an illustration of a section of a wafer being processed according to the invention. The section is taken perpendicular to the surface of the wafer and the plane of the thin films. The phase of the process illustrated is defining the track width of the sensor before CMP.
Figure 5:
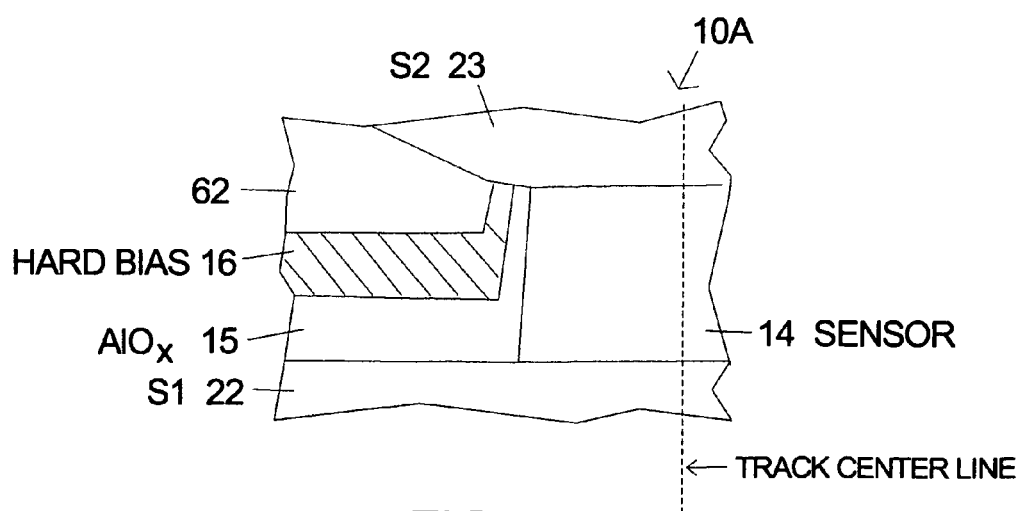
FIG. 5 is an illustration of a section of a completed magnetic head processed by CMP according to the invention.

FIG. 4 is an illustration of a section of a wafer 11 on which thin film magnetic heads are being fabricated according to the invention. The section is taken perpendicular to the surface of the wafer and the plane of the thin films. Typically a large number of heads or other devices are fabricated simultaneously on a wafer. The discussion below illustrates the method of the invention for a single head, but any number of heads can be fabricated simultaneously with the invention. The sensor 14 is shown as a single layer for convenience; however, sensors have a plurality of layers. The details of the substructure of the sensor are outside of the scope of the invention and are according to the prior art. In CPP sensors such as a TMR, the lower electrical lead 22 is also the magnetic shield S1. The upper electrical lead is also a magnetic shield S2 but has not been formed at this stage of the process. The hard bias layer structure 16 which conventionally abuts the sensor must be electrically insulated from the sensor and the S1 shield. The hard bias structures are, therefore, insulated from the sensor structure by the sidewall portion of dielectric layer 15 which is typically alumina. The section of the head shown in FIG. 4 is along the plane which will become the air-bearing surface after further processing. The phase of the fabrication process represented in FIG. 4 is when the track width of the sensor 14 is defined. The sensor 14 has been deposited and patterned using photoresist 64 and the refill materials which form the structures at the sides of the sensor have been deposited. The first layer of the refill stack is a dielectric such as alumina 15 as in the prior art. The hard bias structure 16 in one example consists of three layers: chromium (Cr), a hard ferromagnetic material and tantalum (Ta) as in the prior art. Any other hard bias structure can be used with the invention as well. The hard bias structure 16 is followed by a layer 62 which can be a dielectric according to the prior art or a CMP resistant metal can be substituted instead. The CMP-resistant metal is selected from the group consisting of rhodium, chromium, vanadium and platinum. The subsequent CMP resistant mask layers are according to the prior art and can be different from the ones shown without affecting the invention. For example, a thin tantalum layer 18 is typically used as an adhesion layer for the diamond-like carbon (DLC) layer 19 which is used as a CMP resistant layer at the selected state of the process.

At the state of the fabrication process shown in FIG. 4 the method of the invention uses a slurry with a mild abrasive action in a CMP process to lift-off the photoresist 64. The slurry contains an abrasive of spherical particles of silica, alumina, titania or zirconia. Colloidal forms of the particles are preferred with colloidal silica being preferred. Combinations of these abrasives can be used. The size of the particle is preferably less than 0.015 microns. The slurry can contain from 1% to 30% of the spherical abrasive with 5% being a preferred target. The pH is preferably alkaline and even more preferably has a pH of about 10–11. For a typical prior art photoresist the slurry according to the invention can be adjusted to achieve removal rates of less than 50 nm/minute. The CMP is preferably executed for 10 to 60 seconds. A relatively low pressure for the polishing of 2–3 psi is preferred. Rotation rates of less than 50 rpm are preferred for polishing table and wafer carrier. When the CMP according to the invention is executed on the refill structure, a longer acceptable processing window is opened up and the result is a higher yield from the manufacturing line.

Figure 6:
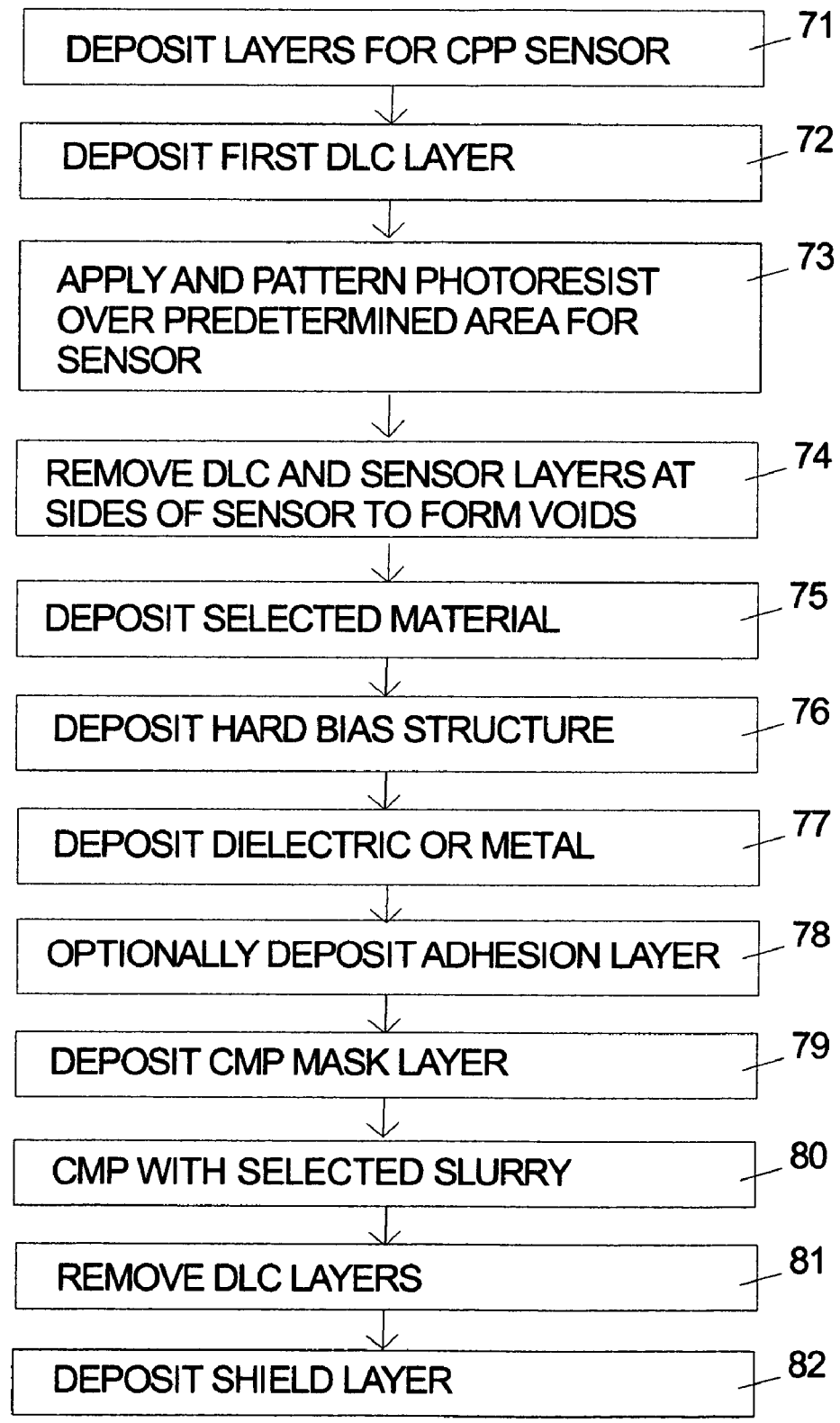
FIG. 6 is a flowchart of an embodiment of a method according to the invention.

FIG. 6 is a flowchart of an embodiment of a method according to the invention. The plurality of layers for the CPP sensor structure are deposited according to the prior art 71. Preferably a DLC layer 63 is deposited over the sensor structure 72. A photoresist 64 is patterned to protect the selected area of the sensor structure along the dimension which will become the width of the sensor 73. A CPP sensor structure width is defined by removing excess sensor material at left and right sides of the sensor structure to form voids at the left and right sides of the sensor structure to define the track width 74. The first dielectric material 16 is deposited over the wafer 75. This dielectric will be deposited into the voids and onto to the exposed sides of the sensor structure, as well as the photoresist. The layers for a hard bias structure 16 are deposited onto the dielectric material 76. Next a dielectric or CMP resistant metal is deposited onto the hard bias structure 77. Optionally an adhesion layer is deposited 78. One or more layers for a CMP resistant mask are deposited 79. The CMP-assisted lift-off of the photoresist and the excess materials is executed at this point using the slurry according to the invention 80. The CMP resistant mask 19 and the DLC layer 63 are removed after completion of the CMP process 81. The fabrication of the head continues at this point according to the prior art including the formation of the upper shield (S2) which is also the upper electrical lead 82.

The relative dimensions of the films and structures of the magnetic head are according to the prior art. As an example, a head according to the invention could have a sensor structure about 50 nm thick with the first dielectric 15 being about 25 nm. The hard bias structure 16 would be about 25 nm and the CMP resistant metal layer 62 would be about 30 nm.

Although the embodiments of the invention have been described in particular embodiments those skilled in the art will recognize that the invention may be used in other embodiments where similar conditions exist.

The invention claimed is:

1. A method of fabricating thin film magnetic heads on a wafer comprising the steps of:
    depositing selected layers for a magnetic sensor on the wafer;
    patterning a photoresist mask over a predetermined position on the wafer for the magnetic sensor;
    forming the magnetic sensor width by removing the selected layers around the photoresist mask at opposite sides of the magnetic sensor structure to form voids at first and second sides of the magnetic sensor;
    depositing a dielectric material into the first and second voids and over the photoresist mask;
    depositing one or more layers for a hard bias structure into the voids onto the dielectric material;
    depositing a selected material onto the hard bias structure, the selected material being from the group consisting of rhodium, chromium, vanadium and platinum;
    depositing a CMP resistant mask over the selected material; and
    removing the photoresist and all material deposited above the photoresist by a process which includes chemical-mechanical polishing (CMP) using a slurry with spherical particles less than 0.015 microns in size.

2. The method of claim 1 wherein the spherical particles are colloidal silica.

3. The method of claim 1 wherein the spherical particles are colloidal titania.

4. The method of claim 1 wherein the spherical particles are colloidal alumina.

5. The method of claim 1 wherein the spherical particles are colloidal zirconia.

6. The method of claim 1 wherein the slurry is alkaline.

7. The method of claim 1 further comprising the step of fabricating a magnetic shield over the magnetic sensor after removing the photoresist.

8. The method of claim 1 wherein the magnetic sensor is a CPP magnetic sensor.

9. The method of claim 1 wherein the step of depositing one or more layers for a CMP resistant mask further comprises depositing DLC.

10. The method of claim 1 wherein the step of depositing one or more layers for a CMP resistant mask further comprises depositing tantalum.

11. The method of claim 1 further comprising the step of fabricating a magnetic shield over the magnetic sensor after removing the photoresist.

12. The method of claim 1 further comprising the step of depositing a layer of DLC after depositing selected layers for a magnetic sensor and prior to patterning the photoresist mask.

13. The method of claim 1 further comprising the step of depositing an adhesion layer prior to depositing the CMP resistant mask.

14. The method of claim 1 further comprising the step of depositing an adhesion layer of tantalum prior to depositing the CMP resistant mask.

15. The method of claim 1 wherein the CMP resistant mask includes a layer of DLC.

* * * * *